B. G. LAMME.
ELECTRIC APPARATUS.
APPLICATION FILED MAY 6, 1907.
911,018.
Patented Jan. 26, 1909.
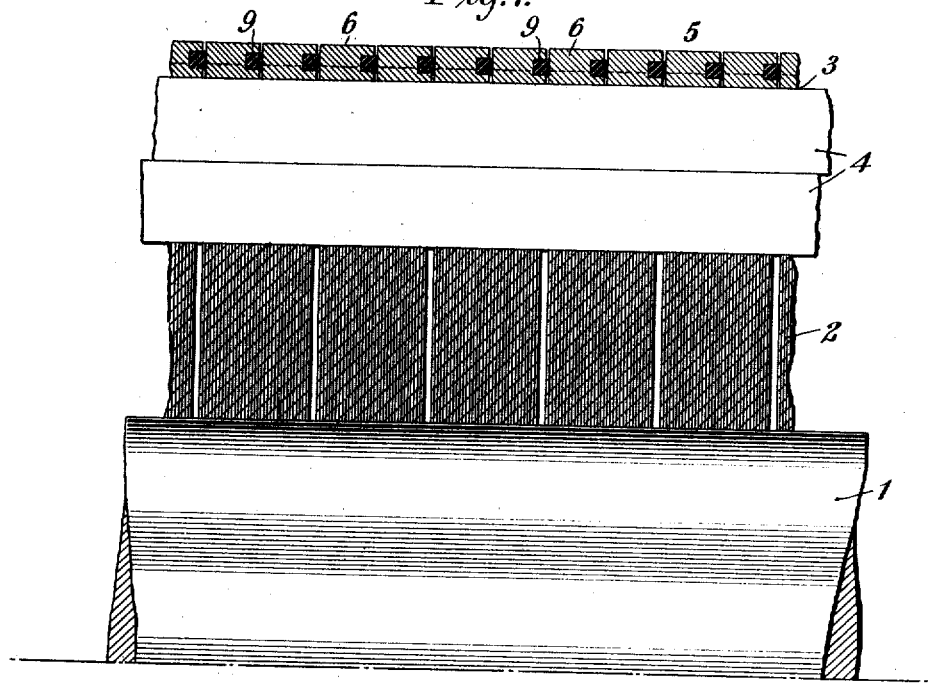
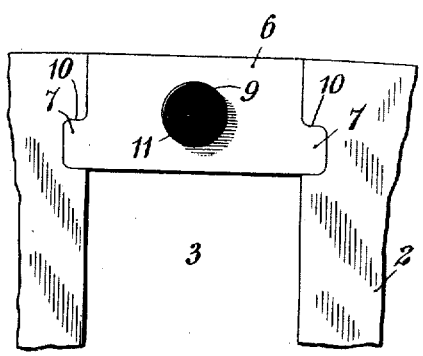
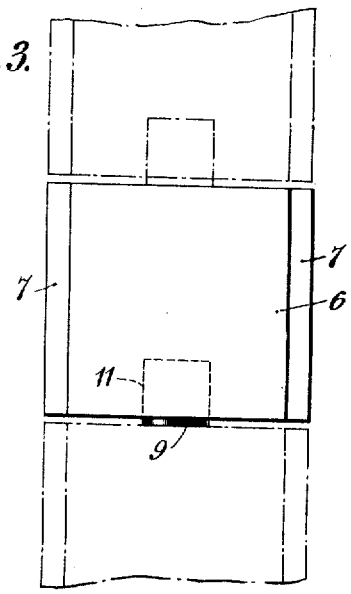
WITNESSES:
C. L. Belcher
R. F. Barbour
INVENTOR
Benj. G. Lamme
BY
Wiley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC APPARATUS.

No. 911,018.    Specification of Letters Patent.    Patented Jan. 26, 1909.

Application filed May 6, 1907. Serial No. 372,164.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Electric Apparatus, of which the following is a specification.

My invention relates to electrical apparatus, and has special reference to the rotatable members of such dynamo-electric machines as are equipped with laminated core structures and are adapted to operate at relatively high speeds.

The object of my invention is to provide improved means for securing the magnetizing winding in the slots of laminated core structures that shall be simple and durable in construction and well adapted to resist the centrifugal forces which are produced by high-speed rotation.

Electrical generators driven by steam turbines, and other high-speed dynamo-electric machines, are often provided with rotatable core members which are built up of a plurality of magnetizable disks assembled on shafts and have longitudinal peripheral slots to receive an electric-current-carrying winding. When such machines are rotating at high speeds, the windings so located have a tendency, by reason of centrifugal forces, to leave the slots and must, therefore, be held in position by wedges or other suitable means. According to my present invention, I provide, for this purpose, segmental strips comprising relatively short metal blocks that are separated by insulating spacers. In this way, losses resulting from eddy-currents which might be induced in longer wedge-strips are materially reduced and, furthermore, strains, which might otherwise be produced in the core structure, are entirely avoided, since a slight circumferential adjustment of the laminæ relative to each other is permitted. While the adjustment just mentioned is scarcely perceptible, material strains in the core structure would be produced if it were prevented by the use of relatively long wedges.

My invention is illustrated in the accompanying drawings, in which—

Figure 1 is a sectional elevation of a portion of a laminated core structure constructed in accordance with my invention, and Figs. 2 and 3 are detail views of the segmental wedge strip shown in Fig. 1.

Referring to the drawings, the structure here illustrated comprises a rotatable shaft 1 and a laminated core member 2, having slots 3 in which the current-carrying winding 4 is located, and strips 5 which hold the winding in position. Each of the strips 5 comprises a plurality of wedge-blocks 6 of brass or other suitable non-magnetic metal, having lateral ribs or projections 7, that are separated from each other by insulating spacers 9. The side walls of the slots 3 are provided with longitudinal grooves 10 near the periphery of the core which are engaged by the lateral projections from the blocks. The insulating spacers 9 may be of any suitable form and, as illustrated in the drawings, they are short insulating pins and each of them is fitted into and projects from a suitable recess 11 in one end of the corresponding block.

It will, of course, be readily understood that the wedge-blocks of my present invention are not restricted in their use to any particular class of electrical apparatus and that they may be applied to both stationary and rotatable core members, which may or may not be laminated.

I claim as my invention:

1. In electrical apparatus, the combination with magnetizable core member having slots therein, of a plurality of coil-retaining blocks disposed in each slot and separated by air spaces, and relatively narrow insulating spacers disposed between the blocks to maintain the air spaces.

2. In electrical apparatus, the combination with a magnetizable core member having slots therein, and longitudinal grooves in the side walls of the slots, of a plurality of metal coil-retaining blocks having projections which engage said grooves, and relatively narrow insulating spacers between said blocks.

3. In electrical apparatus, the combination with a laminated magnetizable core member having longitudinal peripheral slots, and longitudinal grooves in the side walls of the slots near the core surface, of a plurality of coil-retaining blocks each of which has a recess in one end and is provided with lateral projections to engage said grooves, and insulating pins secured in and projecting from the recesses.

4. A magnetizable core having longitudinal slots the side walls of which are provided with grooves, coils in said slots, metal coil-retaining blocks disposed end to end in each slot and projecting into said grooves, and relatively narrow insulating spacers interposed between the coil-retaining blocks.

5. A magnetizable core having longitudinal slots provided with side wall grooves, coils in said slots, metal coil-retaining blocks engaging said grooves and separated by air spaces, and relatively narrow insulating pieces interposed between said blocks to maintain said air spaces.

In testimony whereof, I have hereunto subscribed my name this 27th day of April, 1907.

BENJ. G. LAMME.

Witnesses:
ELIZABETH LIVINGSTONE,
BIRNEY HINES.